United States Patent [19]

Ozaki

[11] Patent Number: 5,276,416
[45] Date of Patent: Jan. 4, 1994

[54] CIRCUIT BREAKER
[75] Inventor: Masashi Ozaki, Suzuka, Japan
[73] Assignee: Kabushiki Kaisha Toshiba, Kawasaki, Japan
[21] Appl. No.: 946,769
[22] Filed: Sep. 17, 1992
[30] Foreign Application Priority Data
  Sep. 20, 1991 [JP] Japan .................. 3-240960
  Sep. 20, 1991 [JP] Japan .................. 3-240961
  Sep. 27, 1991 [JP] Japan .................. 3-249226
[51] Int. Cl.⁵ .......................... H01H 73/00
[52] U.S. Cl. .......................... 335/18; 361/42
[58] Field of Search ................ 361/42–; 335/18

[56] References Cited
U.S. PATENT DOCUMENTS
  4,013,929  3/1977  Dietz et al. .................. 335/18
  4,086,549  4/1978  Slater et al. ................. 335/18
  4,916,419  4/1990  Winter .
  4,951,019  8/1990  Gula .
  4,963,849 10/1990  Kowalczyk .................. 335/201

Primary Examiner—Lincoln Donovan
Attorney, Agent, or Firm—Limbach & Limbach

[57] ABSTRACT

A circuit breaker includes an insulative case and three first current transformers for detecting load currents. Each first current transformer has a U-shaped core with a gap and is disposed so that a movable contact arm is positioned in the gap. Three second current transformers for control power source are disposed between main contacts for opening and closing power feed path to loads and power-supply side terminals. An output of each second current transformer is supplied to a power source circuit of a control circuit. A zero-phase-sequence transformer for detection of an earth fault current is disposed between the movable contact arms and load side terminals in the case. A control circuit generates an overcurrent trip signal based on an detection output of each first current transformer and an earth leakage trip signal based on an detection output of the zero-phase-sequence current transformer. A tripping device opens main contacts in response to the overcurrent trip signal and the earth leakage trip signal. The control circuit and the tripping device are disposed in the space at the zero-phase-sequence current transformer side in the case.

7 Claims, 10 Drawing Sheets

CIRCUIT BREAKER

BACKGROUND OF THE INVENTION

1. Field of the Invention

This invention relates to an electrical circuit breaker of the type that main contacts provided across electric supply lines connected to a load are opened upon flow of an excessive current such as an overload current.

2. Description of the Prior Art

Conventional electrical circuit breakers of the above-described type comprise a current transformer for detecting an overcurrent, a control circuit generating an overcurrent trip signal based on a detection output of the current transformer, and a tripping device for opening the main contacts provided across the electric supply lines, via a switching mechanism. In these circuit breakers, the current transformer, the control circuit and the tripping device are disposed at respective positions away from the switching mechanism opening and closing the main contacts and nearer to terminals of the load side.

When the circuit breaker of the above-described type is employed for three-phase circuits, particularly, three current transformers with the electric supply lines to the load as respective primary conductors are provided since the detection of the overload current needs to be performed for the respective electric supply lines. The three transformers thus occupy concentrated positions in proximity to the load side terminals. In the above-described circuit breaker employed for the three-phase circuit, when a zero-phase-sequence current transformer is incorporated for addition of a function of an earth leakage breaker or when a control power transformer is incorporated, these are also disposed in proximity to the load side terminals. Consequently, the assembly of the circuit breaker is complicated and its compactness is prevented although that has been desired from the standpoint of secured distance for insulation.

SUMMARY OF THE INVENTION

Therefore, an object of the present invention is to provide a circuit breaker wherein an unavoidable useless space in the case can be effectively used for disposition of the current transformers and accordingly, concentration of the parts can be avoided and improvement in the readiness of assembly and compactness can be achieved.

The present invention provides a circuit breaker comprising an insulative case enclosing a first electric conductor extending from one end of the case toward the other end thereof and a second electric conductor extending from said other end of the case toward said one end thereof. A power-supply side terminal is provided on the first conductor at said one end side of the case. A load side terminal is provided on the second conductor at said other end side of the case. A movable contact arm carries a movable contact electrically connected to an end side of the second conductor opposite to the load side terminal and is disposed for rotative movement. The movable contact composes main contacts together with a fixed contact connected to an end side of the first conductor opposite to the power-supply side terminal. A switching mechanism is disposed between the main contacts and the load side terminal of the second conductor in the insulative case for rotatively moving the movable contact arm, thereby opening and closing the main contacts. A current transformer is disposed between the power-supply side terminal and the main contacts in the insulative case.

The current transformer may be positioned so that the movable contact arm extends through it.

In accordance with the above-described circuit breaker, the current transformer is disposed in the space between the power-supply side terminal and the main contacts or disposed together with the movable contact arm. This space in which the current transformer is disposed is conventionally useless. Consequently, the congestion of the parts can be relieved and the readiness of assembly of the circuit breakers can be improved. Furthermore, the circuit breaker can be rendered compact since the space which was conventionally useless can be effectively utilized.

The current transformer employed for securing the control power or for other purposes is disposed together with the first conductor so that the first conductor serves as a primary conductor of the current transformer. The current transformer employed for detecting the overcurrent are disposed together with the movable contact arm respectively so that the movable contact arm serves as a primary conductor of the current transformer. The zero-phase-sequence current transformer for breaking the earth leakage is disposed across the second conductor so that the second conductor serves as a primary conductor of the zero-phase-sequence current transformer.

Preferably, the current transformer for the overcurrent detection is disposed in the insulative case so that the movable contact arm extends through the current transformer. In this case, the current transformer for the overcurrent protection comprises a core with two ends and coils wound around the core and the core is formed so that an air gap defined between the ends of the core serves as a part of a magnetic path. Consequently, the working for extending the primary conductor through the core of the current transformer can be simplified.

Other objects of the present invention will become obvious upon understanding of the illustrative embodiment about to be described or will be indicated in the appended claims. Various advantages not referred to herein will occur to one skilled in the art upon employment of the invention in practice.

BRIEF DESCRIPTION OF THE DRAWINGS

Embodiments of the present invention will be described with reference to the accompanying drawings in which.

DESCRIPTION OF THE PREFERRED EMBODIMENTS

Figure 1:
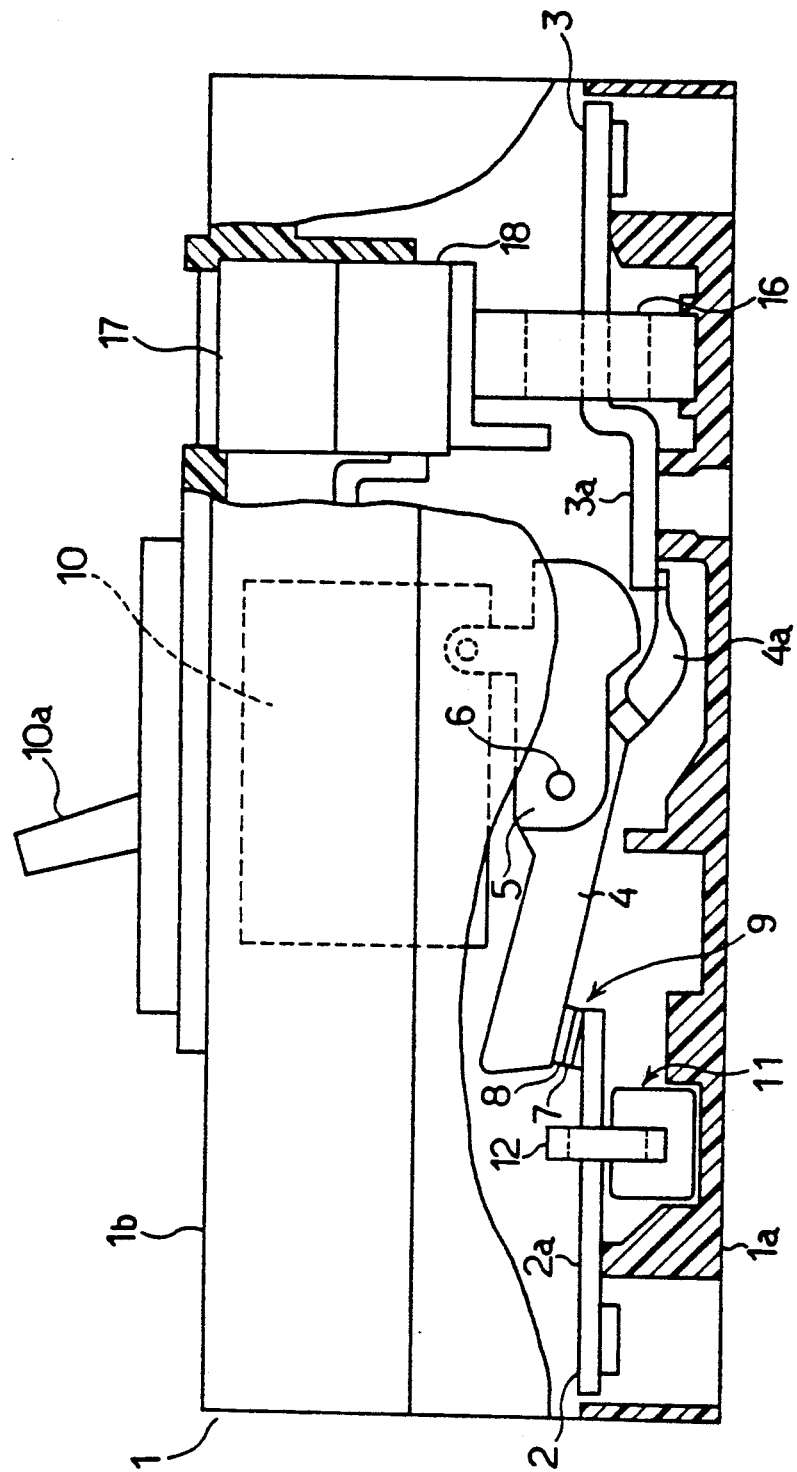
FIG. 1 is a partially longitudinally sectional view of a circuit breaker of a first embodiment in accordance with the invention.
Figure 2:
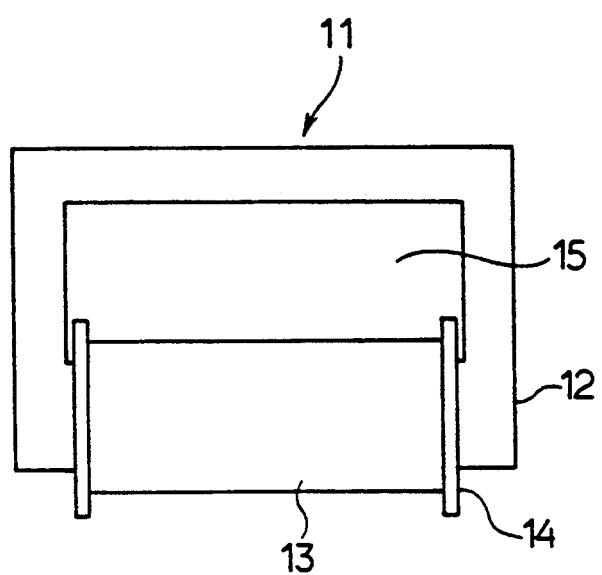
FIG. 2 is a plan view of one of current transformers employed in the circuit breaker.
Figure 3:
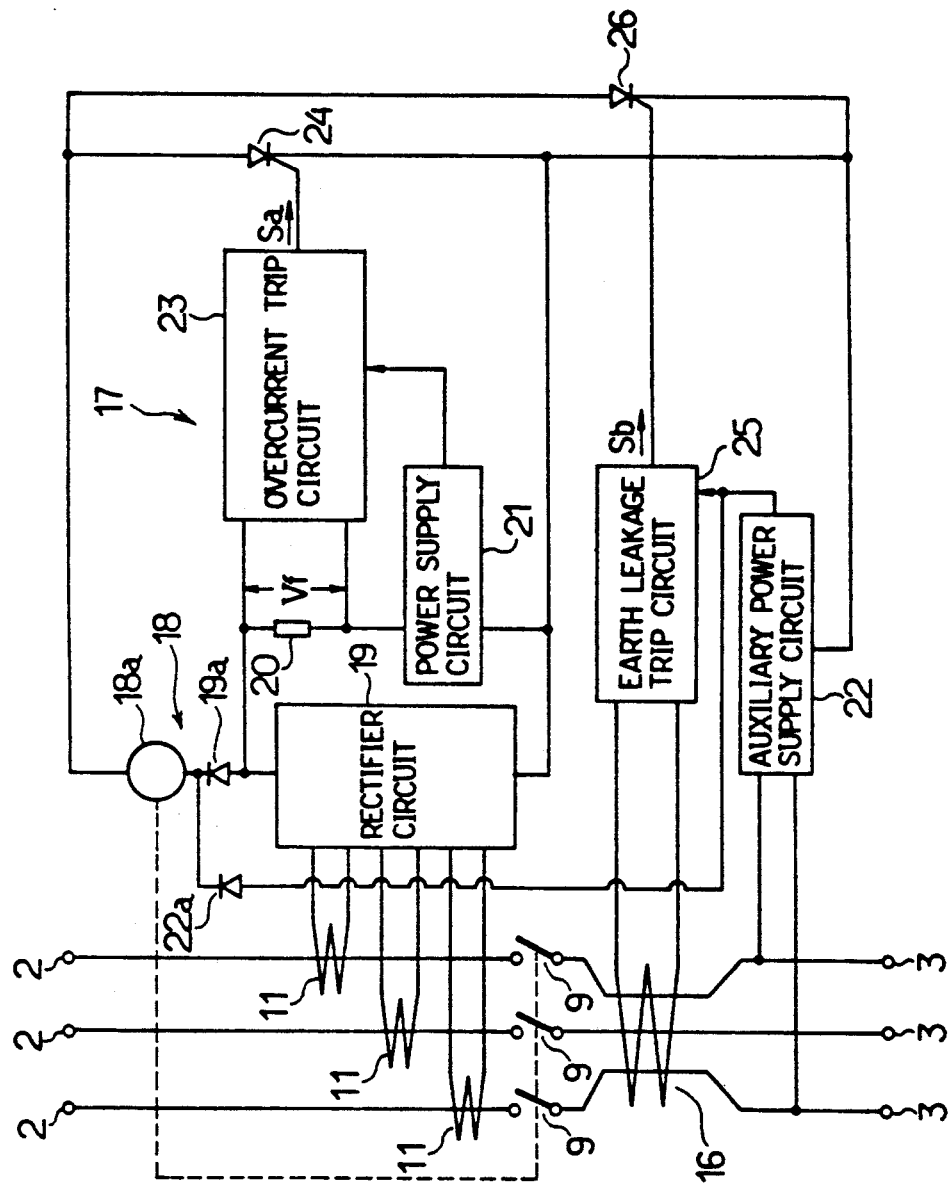
FIG. 3 is a circuit diagram showing an electrical arrangement of the circuit breaker.

A first embodiment of the present invention will now be described with reference to FIGS. 1 through 3. The invention is applied to a three-phase circuit breaker with both of an overcurrent breaking function and an earth leakage breaking function. An insulative or molded case 1 comprises a base 1a and a cover 1b. Three first electric conductors 2a one of which is shown are disposed on the base 1a so as to each extend from one end of the case 1 toward its other end. Three second electric conductors 3a one of which is shown are disposed on the base so as to each extend from said other end toward said one end of the base 1a. Each first conductor 1a has a power-supply side terminal 2 formed integrally with it at its one end corresponding to said one end of the base 1a. Three fixed contacts 7 composing three main contacts 9 respectively are secured on the other ends of the respective first conductors 2a. Only one of the fixed contacts 7 is shown. Each second conductor 3a has a load side terminal 3 formed integrally with it at its one end corresponding to said other end of the base 1a.

Three movable contact arms 4 one of which is shown are disposed in a generally central interior of the case 1. Each movable contact arm 4 is rotatably mounted on a cross bar 5 through a connection pin 6. Three movable contacts 8 are secured to the distal ends of the movable contact arms 4 so as to be engaged with and disengaged from the fixed contacts 7 respectively. The opposite ends of the movable contact arms 4 are electrically connected to the other ends of the second conductors 3a through flexible conductors 4a respectively.

A switching mechanism 10 is provided in a space over the connection pins 6 about which the respective movable contact arms 4 are rotatively moved. The switching mechanism 10 has the same construction as employed in the conventional circuit breakers. Rotative movement of an operating handle 10a is converted to rotative movement of the movable contact arms 4 and the switching mechanism 4 operates to rotatively move the movable contact arms 4 in response to a tripping device 18 so that the main contacts 9 are opened. The opening and closing of the main contacts 9 electrically disconnect and connect the first and second conductors 2a, 3a providing power feed paths to a load.

Three current transformers 11 for detecting a load current to determine an overcurrent are disposed in spaces between the main contacts 9 and the power-supply side terminals respectively. Only one of the current transformers 11 is shown. The current transformers 11 are designed to detect a load current flowing through a power feed path of each phase. More specifically, each current transformer 11 comprises a core 12 configured into a closed loop and a secondary winding 13 wound on a bobbin 14 provided around the core 12, as is shown in FIG. 2. Each current transformer 11 is disposed in the insulative case 1 such that the first conductor 2a having the power-supply side terminal 2 extends through a window 15 of the core 12. As a result, each current transformer 11 produces a detection voltage whose level is in accordance with the magnitude of a load current flowing through the conductor 2a as the primary conductor.

A zero-phase sequence current transformer 16 is disposed in a space between the movable contact arms 4 and the load side terminals 3 in the insulative case 1. The zero-phase-sequence transformer 16 is designed to detect an earth fault current flowing through the power feed path to the load. The zero-phase-sequence current transformer 16 comprises a closed-loop core similar to that of each current transformer 11 and is arranged so that the second conductors 3a having the respective load side-terminals 3 for the three phases collectively serve as a primary conductor. Consequently, the zero-phase-sequence current transformer 16 produces a detection voltage whose level is in accordance with the magnitude of an earth fault current flowing through the conductors 3a serving as the primary conductor.

A control circuit 17 arranged as will be described later and a tripping device 18 are disposed in a space over the zero-phase-sequence transformer 16. The tripping device 18 is provided for rotatively moving the movable contact arms 4 in the circuit-opening direction.

The electrical arrangement of the circuit breaker will be described with reference to FIG. 3. The electric circuitry shown in FIG. 3 is arranged in the same manner as in the conventional three-phase circuit breakers. The tripping device 18 comprises a trip coil 18a which is energized to rotatively move the movable contact arms 4 in the contact-opening direction via the switching mechanism 10 so that the main contacts 9 are opened.

A rectifier circuit 19 of the control circuit 17 rectifies detection voltages detected by the current transformers 11 of the respective phases. Its rectified output is supplied to a power-supply circuit 21 through a resistance 20 composing a current-to-voltage conversion circuit. The resistance 20 generates across its ends a voltage signal $V_f$ whose level is in accordance with the magnitude of the load current. An auxiliary power-supply circuit 22 is provided for rectifying an interphase voltage at the load side terminals 3.

An overcurrent trip circuit 23 fed with power from the power-supply circuit 21 generates an overcurrent trip signal $S_a$ when the level of the load current indicated by the voltage signal $V_f$ from the resistance 20 remains above a predetermined time delay operating level for more than a predetermined operating period. Upon generation of the overcurrent trip signal $S_a$, a thyrister 24 is turned on, so that the trip coil 18a is energized by the rectifier circuit 19 and the auxiliary power-supply circuit 22 through respective diodes 19a and 22a.

An earth-leakage trip circuit 25 is energized by the auxiliary power-supply circuit 22. The earth-leakage trip circuit 25 generates an earth-leakage trip signal $S_b$ when the level of an earth fault current indicated by a detection voltage generated from the secondary side of the zero-phase-sequence current transformer 16 exceeds a predetermined sensitivity current level. Upon generation of the earth leakage trip signal $S_b$, the thyrister 26 is turned on, so that the trip coil 18a is energized either by the rectifier circuit 19 through the diode 19a or by the auxiliary power-supply circuit 22 through the diode 22a.

In the above-described circuit arrangement, electric power feed paths are formed by the respective conductors 2a and 3a. If a fault current such as an overload current or a short-circuit current should flow through at least one of the above-mentioned power feed paths, the fault current is detected by the corresponding current transformer 11. The overcurrent trip signal $S_a$ is generated by the overcurrent trip circuit 23 when the level of current detected by the current transformer 11 remains above the predetermined time delay operating level for more than the predetermined operating period. The thyrister 24 is turned on in response to the overcurrent trip signal $S_a$ such that the trip coil 18a is energized to open the main contacts 9. Thus, an overcurrent tripping operation is performed.

In case that an earth fault current flows through at least one of the power feed paths to the loads, the earth fault current is detected by the zero-phase-sequence current transformer 16. The earth-leakage trip signal $S_b$ is generated by the earth-leakage trip circuit 25 when the level of the detected earth fault current exceeds the predetermined sensitivity current level. The thyrister 26 is turned on in response to the generated earth-leakage trip signal $S_b$ such that the trip coil 18a is energized to open the main contacts 9. Thus, an earth leakage tripping operation is performed.

In accordance with the above-described embodiment, the zero-phase-sequence current transformer 16 requiring a relatively large mounting space is disposed at one side together with the second conductors 3a in the case 1 while the three current transformers 11 are disposed in the space between the main contacts 9 and the power-supply side terminals 2 in the case 1. The space between the main contacts 9 and the power-supply side terminals 2 has conventionally been an empty space. However, this space is utilized for mounting the current transformers 11 in the above-described embodiment. Furthermore, the space for mounting the second conductors 3a need not be increased. Thus, the circuit breaker can be rendered small-sized.

Figure 4:
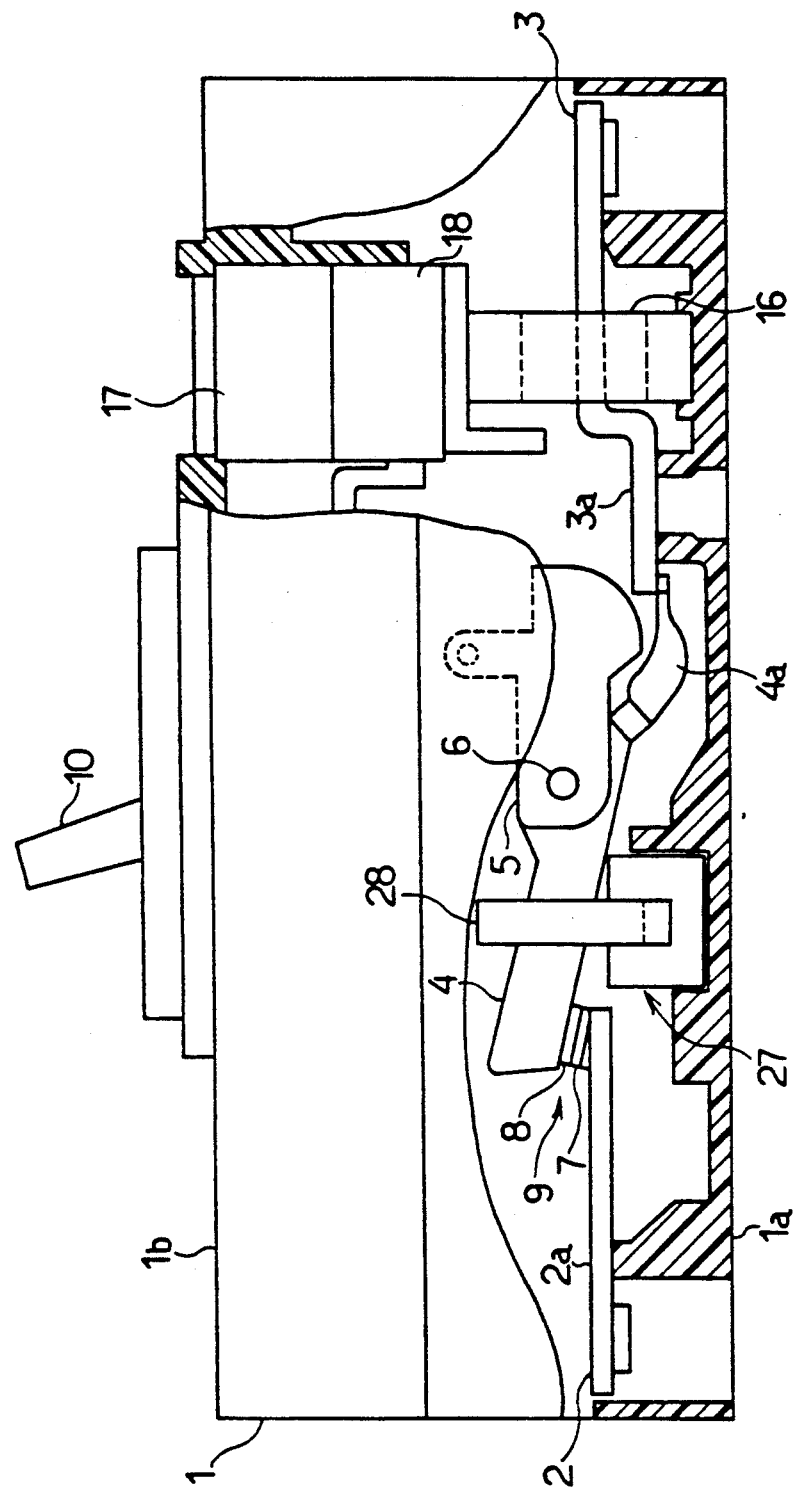
FIG. 4 is a view similar to FIG. 1 showing the circuit breaker of a second embodiment.
Figure 5:
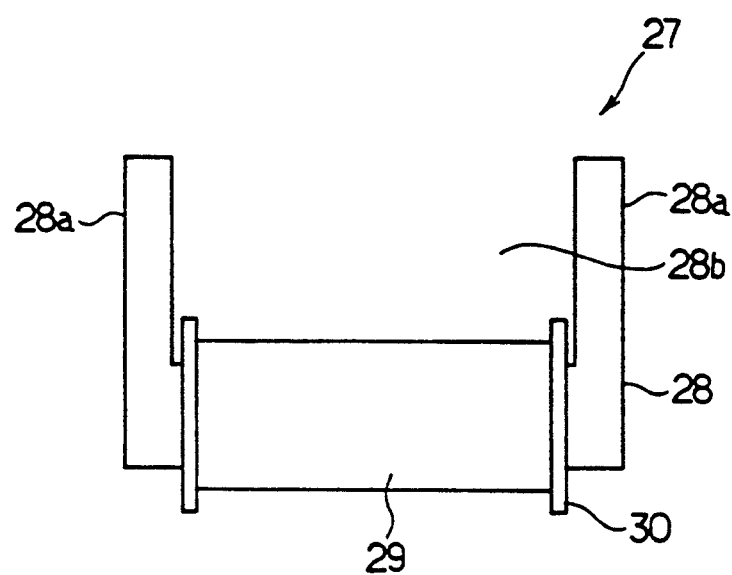
FIG. 5 is a plan view of one of current transformers employed in the circuit breaker.

FIGS. 4 and 5 illustrate a second embodiment of the invention. Difference between the first and second embodiments will be described. The second embodiment is characterized by provision of three current transformers 27 for which the movable contact arms 4 serve as the first conductors respectively, as is shown in FIG. 4. Each current transformer 27 comprises a generally U-shaped core 29 having two ends and a secondary winding 29 wound about a bobbin 30 provided around the core 28, as is shown in FIG. 5. An air gap between the both ends of each core 28 is used as a part of the magnetic path. Each transformer 27 is disposed so that the movable contact arm 4 extends through the space between opposed yoke portions 28a. Consequently, the detection voltage can be obtained from a secondary winding 29 of each current transformer 27 and the level of the detection voltage is in accordance with the magnitude of the load current flowing through each contact arm 4 serving as the primary conductor. Since each current transformer 27 has the U-shaped core 28 having the air gap 28b between the yoke portions 28a, the working for inserting the primary conductor through the air gap 28b can be simplified as compared with that in the closed-loop core.

Figure 6:
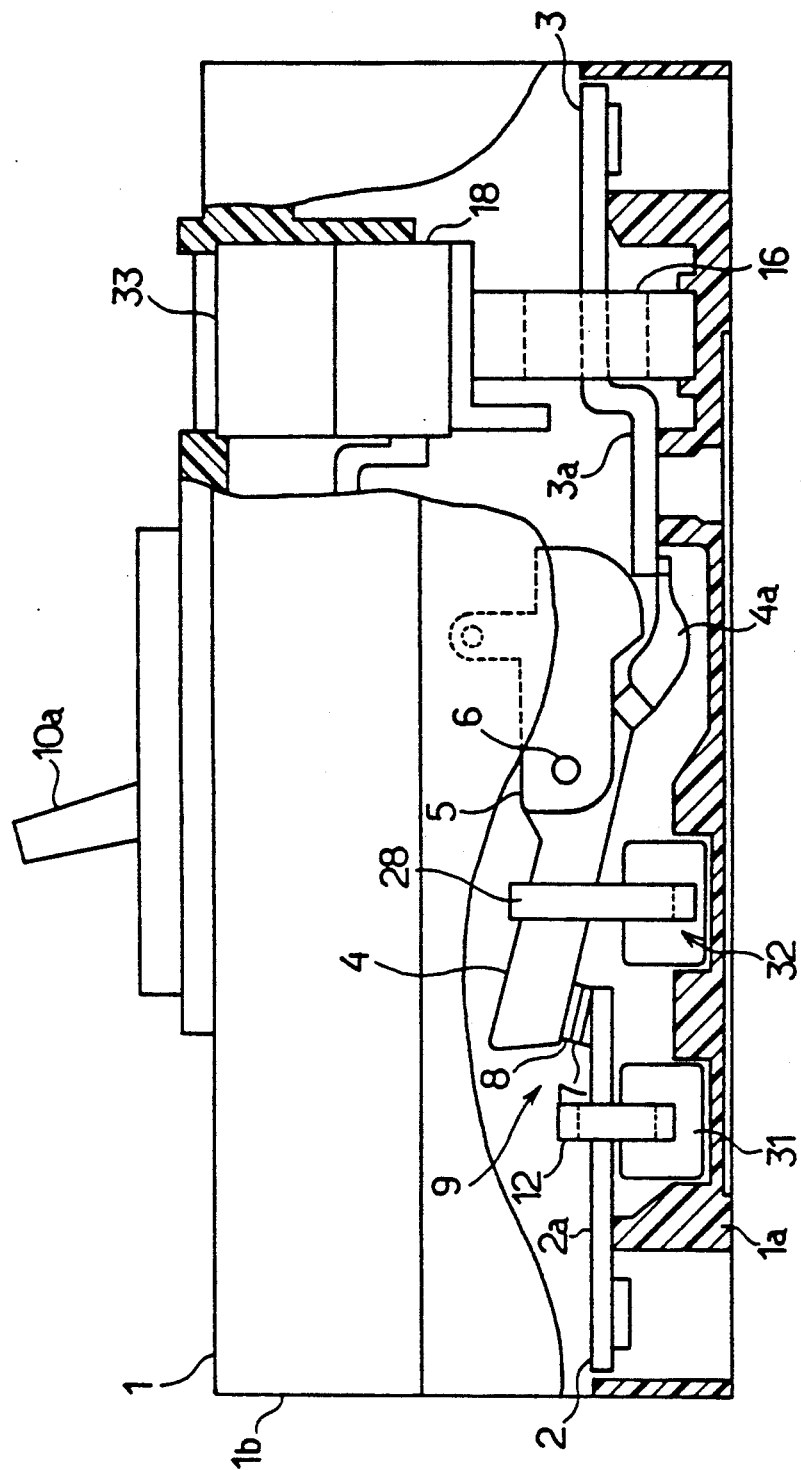
FIG. 6 is a view similar to FIG. 1 showing the circuit breaker of a third embodiment.
Figure 7:
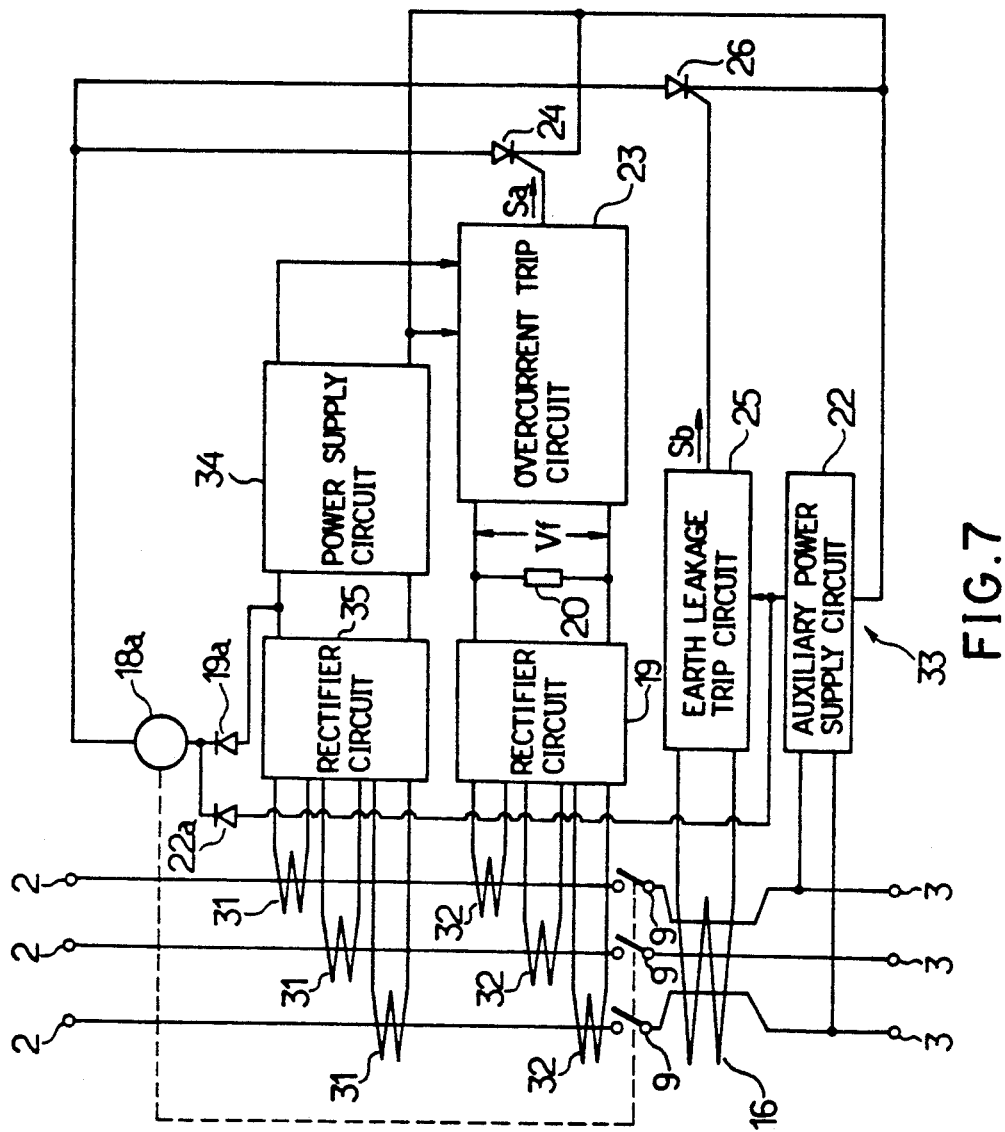
FIG. 7 is a circuit diagram showing an electrical arrangement of the circuit breaker.
Figure 8:
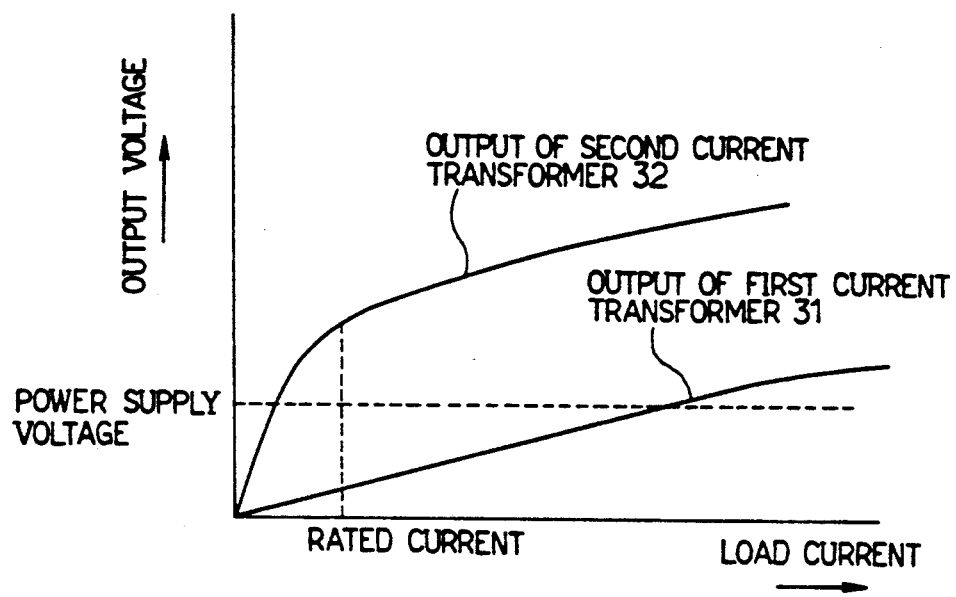
FIG. 8 is a graph showing the current-detection characteristics of first and second current transformers employed in the circuit breaker of the third embodiment.

FIGS. 6 through 8 illustrate a third embodiment of the invention. Same parts as in the first embodiment are labeled by the identical reference numerals. In FIG. 6, three first current transformers 31 one of which is shown are formed into the same arrangement as that shown in FIGS. 1 and 2 and are disposed in the case 1 so that the first conductors 2a serve as the primary conductors for the respective current transformers 31. These first current transformers 31 are for the control power supply. Three second current transformers 32 one of which is shown are formed into the same arrangement as that shown in FIG. 5 and are disposed in the case 1 so that the movable contact arms 4 serves as the primary conductors for the second current transformers 32 respectively. In a control circuit 33, a power-supply circuit 34 corresponding to the circuit 21 is provided independently. The output of each current transformer 31 is supplied to the input side of the power-supply circuit 34 through a rectifier circuit 35.

FIG. 8 shows the characteristics of the detection voltage detected by each first current transformer 31 and the detection voltage detected by the second current transformer 32. Since the core 28 of each second current transformer 31 has the air gap 28b, the load current at the time of saturation of each current transformer 31 takes a relatively large value even though the volume of the core 28 is small. Accordingly, the linearity of the detection voltage can be maintained over a vast range even when each second current transformer 32 is rendered small-sized. Furthermore, the output of each gapless first current transformer 31 is saturated with a relatively small load current but is only used as the power supply for the overcurrent trip circuit. As a result, the core 12 of each first current transformer 31 can be rendered small-sized without any problems about its function. That is, both of the first and second current transformers 31, 32 can be rendered small-sized, which can contribute to the miniaturization of the circuit breaker.

Figure 9:
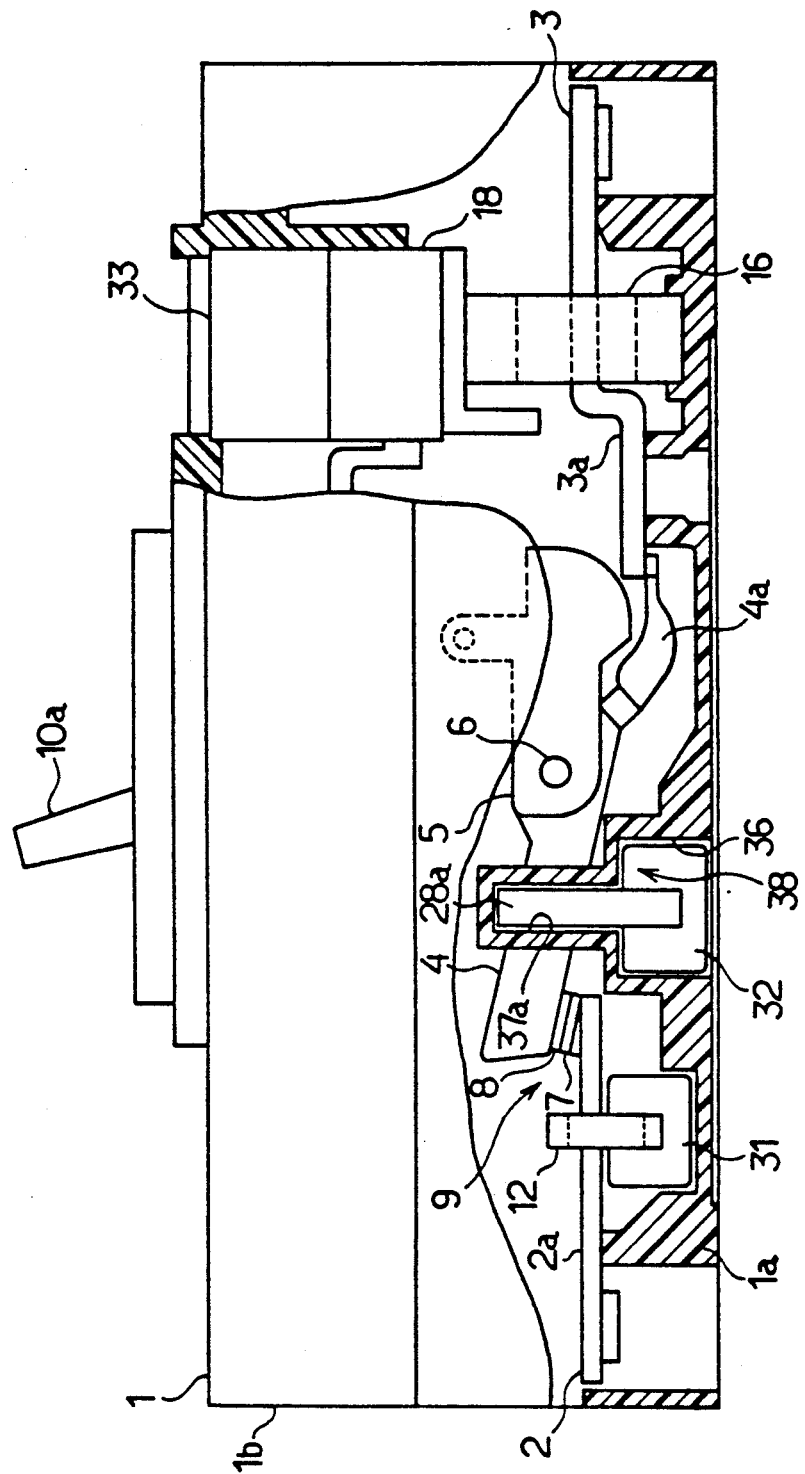
FIG. 9 is a view similar to FIG. 1 showing the circuit breaker of a fourth embodiment.
Figure 10:
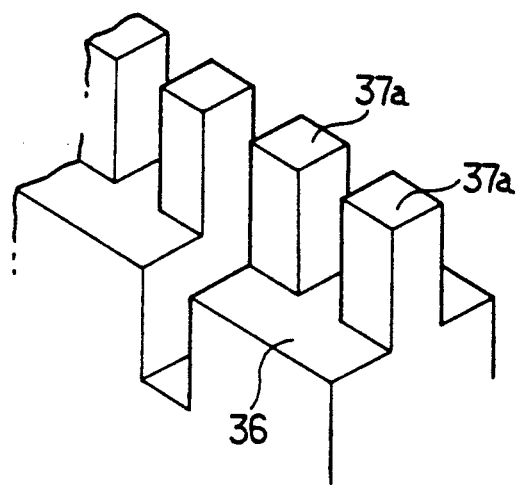
FIG. 10 is a perspective view showing a part of an insulative case of the circuit breaker.

FIGS. 9 and 10 illustrate a fourth embodiment. The same parts as those in FIG. 6 are labeled by the identical reference numerals. The base 1a has three hollow portions 36 formed integrally with it and three pairs of hollow protrusions 37a and 37b also formed integrally with it. Three containing sections 38 are defined by the respective hollow portions 36 and the respective pairs of the hollow protrusions 37a, 37b. More specifically, each hollow portion 36 is formed on the portion of the base 1a corresponding to each movable contact arm 4 so as to be expanded to the side of the cover 1b. Each hollow portion 36 has a rear open end. The three pairs of hollow protrusions 37a, 37b communicate to and are projected from the respective hollow portions 36. Each pair of the hollow protrusions 37a, 37b are opposed to the adjacent pair with an area of rotative movement of each movable contact arm 4 interposed therebetween. The foregoing second current transformers 32 are contained in the respective containing sections 38. In this state, the secondary windings 29 of the current transformers 32 are disposed in the respective hollow portions 36 and both yoke portions 28a of the cores 28 are disposed in the respective hollow protrusions 37a.

In accordance with the above-described construction, the current transformers 32 are only inserted into the containing sections 38 through the rear open ends respectively. Consequently, the efficiency in the assembly of the circuit breakers can be improved. Furthermore, the walls defining the containing sections 38 are placed between the current transformers 32 and the conductors 2a, 3a, 4 composing the power feed paths to the loads, respectively. Consequently, the current transformers 32 can be insulated from those conductors with a simplified insulation structure.

The foregoing disclosure and drawings are merely illustrative of the principles of the present invention and are not to be interpreted in a limiting sense. The only limitation is to be determined from the scope of the appended claims.

I claim:

1. A circuit breaker comprising:
   a) an insulative case enclosing a first electric conductor extending from one end of the case toward the other end thereof and a second electric conductor extending from said other end of the case toward said one end thereof;
   b) a power-supply side terminal provided on the first conductor at said one end side of the case;
   c) a load side terminal provided on the second conductor at said other end side of the case;
   d) a movable contact arm carrying a movable contact electrically connected to an end side of the second conductor opposite to the load side terminal and disposed for rotative movement, the movable contact composing main contacts together with a fixed contact connected to an end side of the first conductor opposite to the power-supply side terminal;
   e) a switching mechanism disposed between the main contacts and the load side terminal of the second conductor in the insulative case for rotatively moving the movable contact arm, thereby opening and closing the main contacts; and
   f) a current transformer disposed between the power-supply side terminal and the main contacts in the insulative case.

2. A circuit breaker according to claim 1, wherein the current transformer comprises a closed-loop core through which the first conductor extends and coils wound around the closed-loop core.

3. A circuit breaker comprising:
   a) an insulative case enclosing a first electric conductor extending from one end of the case toward the other end thereof and a second electric conductor extending from said other end of the case toward said one end thereof;
   b) a power-supply side terminal provided on the first conductor at said one end side of the case;
   c) a load side terminal provided on the second conductor at said other end side of the case;
   d) a movable contact arm carrying a movable contact electrically connected to an end side of the second conductor opposite to the load side terminal and disposed for rotative movement, the movable contact composing main contacts together with a fixed contact connected to an end side of the first conductor opposite to the power-supply side terminal;
   e) a switching mechanism disposed between the main contacts and the load side terminal of the second conductor in the insulative case for rotatively moving the movable contact arm, thereby opening and closing the main contacts; and
   f) a current transformer disposed in the insulative case so that the movable contact arm extends therethrough.

4. A circuit breaker according to claim 3, wherein the of the current transformer comprises a core with two ends and coils wound around the core, the current transformer being formed so that an air gap defined between the ends thereof serves as a part of a magnetic path, in the condition that the current transformer is disposed in the insulative case so that the movable contact arm extends therethrough.

5. A circuit breaker according to claim 3, wherein the insulative case has a bottom wall having a containing space defined by a hollow section formed in the position where the movable contact arm is disposed, the hollow section having an open rear end, and a pair of hollow projections projected from and communicating to the hollow section, the pair of hollow projections being opposed to each other with an area of rotative movement of the movable contact arm interposed therebetween, and the current transformer having a core and coils wound around the core is disposed in the containing space, the coils being disposed in the hollow section and a portion of the core projected from the coils being disposed in the pair of the hollow projections in the state that the transformer is disposed in the containing space.

6. A circuit breaker according to claim 2, further comprising another current transformer disposed in the insulative case so that the movable contact arm extends through said another current transformer, said another current transformer comprising a core with two ends and coils wound around the core, the core being formed so that an air gap defined between the ends thereof serves as a part of a magnetic path.

7. A circuit breaker according to claim 6, further comprising a zero-phase sequence transformer disposed across the second conductor.

* * * * *